252. COMPOSITIONS,

146

Patented Feb. 23, 1937

2,071,989

UNITED STATES PATENT OFFICE 2,071,989

INHIBITOR FOR PICKLING AND CLEANING SOLUTIONS

Myron F. Thomas, Chicago, Ill., assignor, by mesne assignments, to E. I. du Pont de Nemours & Company, Wilmington, Del., a corporation of Delaware No Drawing. Application February 16, 1934, Serial No. 711,548

18 Claims. (Cl. 148—8)

This invention relates to the cleaning and pickling of metal by the action of acids thereon, and is particularly directed to the use in cleaning and pickling baths of certain substances which I have found to have the property of inhibiting the action of acids upon the metal itself, without in any substantial manner hindering the action of the acid on the oxide, rust, scale, or other undesirable incrustations which are to be removed.

Pickling and metal cleaning operations frequently involve the use of a bath of dilute, non-oxidizing acids, such as sulfuric, hydrochloric, acetic, formic, aqueous solutions of acid sulfates, etc., and such baths are used for numerous purposes, of which pickling in steel mills is the most typical representative. The composition, concentration, temperature, and other factors vary with different baths, but the underlying principle comprises, in all cases, the removal of undesirable incrustations by the action of the acid. The base metal so obtained is then, in the absence of an inhibitor, unavoidably subjected to attack by the acid with unnecessary loss of metal, weakening of the article, and unnecessary consumption of acid.

The application of my invention to acid pickling and acid metal cleaning operations does not involve any change in the baths or in the operation thereof, except for the addition of a small amount of the inhibitors of this application. My inhibitors will, to a large extent, prevent attack of acid on the base metal when added in quantities as small as 0.01%. I generally prefer to use between about 0.02% and 0.1%, but more may be used if desired.

I have found that steep water obtained by steeping grains constitutes an excellent inhibitor, and have also found that sulfurized steep water and the reaction product of steep water and thiosulfates may be used as inhibitors.

The exact chemical composition of the steep waters obtained from various grains is very complex and is at present unknown to me. Generally speaking, the steep waters contain mineral salts, organic phosphoric acids, nitrogenous substances (such as proteins), etc.

The steep waters of various grains are obtained by steeping the grains in water. Corn steep water, for instance, is made commercially by steeping corn kernels with water containing 0.25% to 0.30% sulfur dioxide at 115° to 125° F. for 30 to 40 hours. The water is circulated by means of a steam siphon. The light steep water obtained is concentrated to the desired degree by evaporation. My starting material contained about 60% solids. The steep water is a by-product of starch manufacture. My steep waters did not show starch by the iodine test.

Following one specific embodiment of my invention, to a 5% sulfuric acid solution I added corn steep water in the amount required to supply 0.025% of the solids contained in the steep water. The solution thus formed was very satisfactory for use in cleaning and pickling metals.

The amount of steep water added may vary widely, but in general I prefer to use between about 0.01% and 1.0% (dry basis) of steep water.

Instead of adding the steep water to an acid solution, I may add the solids, obtained by drying steep water, to an acid solution or to a compound or mixture of compounds adapted for use in cleaning and pickling compositions.

I have particularly mentioned corn steep water, but I do not intend to be limited thereto. Steep water obtained from other grains, such as oats, barley, rice, wheat, etc., may be advantageously used. I have found, however, that corn steep water is a more efficient inhibitor, and is more satisfactory than the other grain steep waters.

While the steep waters are excellent inhibitors, I have found that sulfurizing the steep waters results in a marked increase in their efficiency in preventing the attack of acids on metals.

My preferred inhibitor is made as follows: One hundred parts by weight of concentrated corn steep water (60% solids) was intimately mixed with 10 parts by weight of rubber maker's sulfur and the mixture heated at 120–125° C. for two hours. At the end of this sulfurization the remainder of the water was evaporated at 100° C. The dark brown, brittle product was ground to a fine powder. This product, which I shall refer to as dry sulfurized corn steep water, is preferably sold in the dry powdered form for addition to cleaning or pickling baths. No addition of dispersing agents is needed, as my product disperses readily.

The quantity of my sulfurized steep water to be used in cleaning and pickling solutions may vary widely. Very satisfactory results were obtained using from about 0.01% to 1.0% of the dry product in a 5% sulfuric acid bath. I prefer to use about 0.0025% of the dry product in a 5% sulfuric acid solution, and to use proportionately larger or smaller amounts in more or less concentrated acid solution.

Instead of sulfurizing corn steep water, I may sulfurize steep waters obtained from other grains, such as oats, barley, rice, wheat, etc., to obtain satisfactory inhibitors. I have found, however, that sulfurized corn steep water is a more efficient and more desirable inhibitor than the inhibitors obtained by sulfurizing other grain steep waters.

In my above example the amount of sulfur is given as 10 parts by weight, and while the most satisfactory results are thus obtained, I do not intend to be limited thereto. It is noted that as the steep water contained 60% solids, the sulfur was added in a ratio of one part of sulfur to six parts of steep water solids. I have obtained satisfactory results using from about one-half to two parts of sulfur to six of steep water solids. Other suitable sulfurizing agents may be used if desired.

The temperatures and time of heating may vary widely. The heating should continue for not less than about one-half hour. I prefer to heat for about one to two hours. The temperature may range upward from 100° C., using high pressures to permit very high temperatures. I prefer to use temperatures near the boiling point of the steep water.

Another group of steep water derivatives which I have found useful as inhibitors are those obtained by treating with thiosulfates. I obtain these derivatives by treating steep water as above described, but substituting thiosulfates, such as sodium thiosulfate for the indicated amounts of sulfur. These derivatives which I shall call thiosulfate treated steep waters, are not as efficient as the corresponding sulfurized steep waters, but are, none the less, very satisfactory inhibitors. The thiosulfate treated steep waters are more efficient than the untreated steep waters of the corresponding grains. The thiosulfate treated corn steep water is more efficient than the thiosulfate treated steep waters of other grains.

I do not fully understand the nature of the chemical reaction between the thiosulfate and the steep waters. The increase in efficiency is, however, evidence that some chemical reaction occurs.

Instead of marketing my inhibitors in the dry form, I may package them as concentrated solutions. Also, if desired, the dry or liquid products of my invention may be mixed with other materials, such as foaming agents, which it is desired to add to cleaning or pickling compositions.

I claim:

1. An inhibitor for use in cleaning and pickling compositions comprising sulfurized grain steep water.

2. An inhibitor for use in cleaning and pickling compositions comprising sulfurized corn steep water.

3. A composition of matter comprising sulfurized grain steep water.

4. A composition of matter comprising sulfurized corn steep water.

5. An acid cleaning or pickling solution containing an inhibitor of the group consisting of grain steep water, sulfurized grain steep water, and thiosulfate treated grain steep water.

6. An acid cleaning or pickling solution containing an inhibitor from the group consisting of corn steep water, sulfurized corn steep water, and thiosulfate treated corn steep water.

7. An acid cleaning or pickling solution containing sulfurized corn steep water.

8. In a process of cleaning metal the step comprising treating the metal with an acid solution which contains an inhibitor from the group consisting of grain steep water, sulfurized grain steep water, and thiosulfate treated grain steep water.

9. In a process of cleaning metals, the step comprising treating the metal with an acid solution which contains an inhibitor from the group consisting of corn steep water, sulfurized corn steep water, and thiosulfate treated corn steep water.

10. In a process of cleaning metals, the step comprising treating the metal with an acid solution which contains sulfurized corn steep water.

11. An acid cleaning or pickling solution containing sulfurized grain steep water.

12. An acid cleaning or pickling solution containing grain steep water.

13. In a process of cleaning metals, the step comprising treating the metal with an acidic solution comprising a material comprising grain steep water.

14. In a process of cleaning metals, the step comprising treating the metal with an acidic solution comprising a material comprising sulfurized grain steep water.

15. An acid cleaning or pickling solution containing thiosulfate treated grain steep water.

16. An acid cleaning or pickling solution containing thiosulfate treated corn steep water.

17. In a process of cleaning metals, the step comprising treating the metal with an acidic solution containing thiosulfate treated grain steep water.

18. In a process of cleaning metals, the step comprising treating the metal with an acidic solution containing thiosulfate treated corn steep water.

MYRON F. THOMAS.